(12) United States Patent
Dall et al.

(10) Patent No.: US 8,599,214 B1
(45) Date of Patent: Dec. 3, 2013

(54) IMAGE COMPRESSION METHOD USING DYNAMIC COLOR INDEX

(75) Inventors: William John Dall, New Westminster (CA); David Victor Hobbs, Surrey (CA)

(73) Assignee: Teradici Corporation, Burnaby, B.C. (CA)

( * ) Notice: Subject to any disclaimer, the term of this patent is extended or adjusted under 35 U.S.C. 154(b) by 949 days.

(21) Appl. No.: 12/698,048

(22) Filed: Feb. 1, 2010

Related U.S. Application Data (60) Provisional application No. 61/161,826, filed on Mar. 20, 2009.

(51) Int. Cl.
*G09G 5/02* (2006.01)

(52) U.S. Cl.
USPC .............................. 345/601; 345/589; 345/593

(58) Field of Classification Search
USPC .......................................... 345/601, 593, 589
See application file for complete search history.

(56) References Cited

U.S. PATENT DOCUMENTS

| | | | | |
|---|---|---|---|---|
| 4,743,959 | A * | 5/1988 | Frederiksen | 375/240.25 |
| 5,003,299 | A * | 3/1991 | Batson et al. | 345/601 |
| 5,384,582 | A * | 1/1995 | Keith et al. | 345/601 |
| 6,038,346 | A * | 3/2000 | Ratnakar | 382/239 |
| 6,198,543 | B1 * | 3/2001 | Ryan | 358/1.9 |
| 6,856,700 | B1 | 2/2005 | Wang | |
| 6,983,074 | B1 * | 1/2006 | Clauson et al. | 382/244 |
| 7,038,696 | B2 | 5/2006 | Emerson et al. | |
| 7,079,684 | B2 | 7/2006 | Bucher | |
| 7,130,474 | B2 | 10/2006 | Luo et al. | |
| 2002/0106019 | A1 * | 8/2002 | Chaddha et al. | 375/240.02 |
| 2003/0177255 | A1 * | 9/2003 | Yun | 709/231 |
| 2004/0017939 | A1 | 1/2004 | Mehrotra | |
| 2004/0071351 | A1 * | 4/2004 | Rade | 382/232 |
| 2006/0077408 | A1 * | 4/2006 | Amirghodsi | 358/1.9 |

OTHER PUBLICATIONS

Gormish, M.J.; , "Compression of palettized images by color," Image Processing, 1995. Proceedings., International Conference on , vol. 1, No., pp. 274-277 vol. 1, Oct. 23-26, 1995, Washington, D.C. USA.
Tony Lin, Pengwei Hao & Sang Lee, "Efficient Coding of Computer Generated Compound Images" in International Conference on Image Processing (ICIP) vol. 1, pp. 561-564, Sep. 2005, Genoa, Italy.
P. Scheunders, S. De Backer, "Joint quantization and error diffusion of color images using competitive learning," icip, vol. 1, pp. 811, 1997 International Conference on Image Processing (ICIP'97)—vol. 1, 1997, Oct. 26-29, 1997, Washington, D.C. USA.
Roytman, E. and Gotsman, C. 1995. Dynamic Color Quantization of Video Sequences. IEEE Transaction on Visualization and Computer Graphics 1, 3 (Sep. 1995)., 274-286, N.J., USA.

* cited by examiner

*Primary Examiner* — David T Welch
(74) *Attorney, Agent, or Firm* — Moser Taboada (57) ABSTRACT

A method for communicating an image section between a first computer and a second computer, the first computer adapted for remotely coupling to the second computer via a network. The method comprises determining, by the first computer, a color table comparison result for an input pixel value, the color table comparison result identifying one of (i) an indexed color value of a color table, the indexed color value approximating the input pixel value, or (ii) an absence in the color table of any color value approximating the input pixel value; generating, based on the color table comparison result, encoded data comprising one of a derivative of the input pixel value or an index for the indexed color value; communicating, to the second computer, the encoded data; and updating the color table according to the color table comparison result.

16 Claims, 7 Drawing Sheets

IMAGE COMPRESSION METHOD USING DYNAMIC COLOR INDEX

CROSS-REFERENCE TO RELATED APPLICATIONS

This application claims benefit of U.S. provisional patent application Ser. No. 61/161,826, filed Mar. 20, 2009, which is herein incorporated in its entirety by reference.

BACKGROUND OF THE INVENTION

1. Field of the Invention

Embodiments of the present invention generally relate to apparatus and methods for compressing and communicating a visual image from a host computer to a remote computer. More specifically, a dynamic color index table is deployed at a host computer to compress sections of the visual image by transforming pixel values to indexed color value approximations which are encoded and communicated.

2. Description of the Related Art

Color image quantization is the process of constructing a reduced color palette for a wide color-range image (e.g., 24-bit color) to represent the color image in a reduced color range (e.g., 8-bit color) for purposes such as supporting low-cost color display or printing devices of reduced capabilities or multimedia compression. Sometimes, such image quantization is used in conjunction with half-toning or dithering techniques, such as error diffusion, to reduce contouring effects and improve the visual quality of the quantized image.

In some cases, such a reduced color palette is determined ahead of time independent of the particular image being encoded. For example, in the case of the 3-3-2 palette popular in wireless applications, 3 bits of color information are used for the red and green channels of an image while 2 bits of color information are used for the blue channel of the image to produce 256 different color values using an 8-bit representation. In other cases, the image is analyzed and a palette selected and ordered to meet image quality, color accuracy, and/or compression objectives.

Some bitmap-oriented image file formats, such as the Graphics Interchange Format (GIF) or Portable Network Graphics (PNG), use color quantization in conjunction with lossless index compression to provide image file size scaling and portability in applications such as the web browsers. However, none of these methods meet the objectives of enabling fast lightweight compression while also maintaining high image quality. These objectives are necessary for software-based compression of high frame rate synthetic image streams as may be encountered in remote display applications.

Therefore, there is a need in the art for a system and method for enabling fast lightweight compression of image streams to provide improved image quality over conventional color image quantization techniques.

SUMMARY OF THE INVENTION

Embodiments of the present invention generally relate to a method for communicating an image section between a first computer and a second computer, the first computer adapted for remotely coupling to the second computer via a network. The method comprises determining, by the first computer, a color table comparison result for an input pixel value, the color table comparison result identifying one of (i) an indexed color value of a color table, the indexed color value approximating the input pixel value, or (ii) an absence in the color table of any color value approximating the input pixel value; generating, based on the color table comparison result, encoded data comprising one of a derivative of the input pixel value or an index for the indexed color value; communicating, to the second computer, the encoded data; and updating the color table according to the color table comparison result.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The term processor as used herein refers to any type of processor, CPU, microprocessor, microcontroller, embedded processor, media processor, graphics processor, or any other programmable device capable of executing and/or interpreting instructions in a form of software (such as microcode, firmware and/or programs).

The term software as used herein refers to any type of computer-executable instructions for any type of processor, such as programs, applications, scripts, drivers, operating systems, firmware, and microcode. Computer-executable instructions include any types of instructions performed by a processor, such as binary instructions that are directly performed, instructions that are translated and/or decoded prior to being performed, and instructions that are interpreted.

The terms 'color table' or 'color index table' as used herein reference a means for storing and managing a set of color values associated with a section of an image by providing an array of indexed color values. Unlike a traditional color palette, a color index table is not necessarily representative of all the color values of an image or image section.

Embodiments of the present invention disclose a system and method for providing image compression using a dynamic color index table. The dynamic color index table provides fast, lossy image processing suitable for compression of high frame rate image streams, such as dynamic computer display image representations that require a relatively high quality output image representation as compared with conventional color quantized images. The present invention may be applied to a variety of image compression applications; in some embodiments, the disclosed methods are applied to real-time remote display applications in which a host computer comprising the source image stream is connected to a remote computer, the remote computer having a display device, by a computer network.

In such remote display embodiments, the host computer comprises a processor system with an encoder and data structures including a source visual image and color index table. The encoder uses dynamic color indexing methods described herein to periodically encode changed regions of the source visual image. Encoded color values and changes to the color index table are communicated to the remote computer where a corresponding client color index table is maintained. A decoder at the remote computer recovers the compressed image, which is then presented on a display as a visual approximation of the source visual image.

In an embodiment, a block or section of the visual image is retrieved and pixel values compared in sequence to a set of color values in the color index table. If a pixel value from the image block is within a specified error threshold range for one of the color values of the color index table, an index to the color value is encoded using a lossless encoding technique, such as exponential encoding, and the color index table re-indexed to reflect the recent match. If the pixel value from the image block does not come within an error threshold of any colors in the color index table, the pixel color value is encoded and inserted in the table.

In some embodiments, pixel values retrieved from the visual image are randomized prior to performing the color index table comparison to prevent contoured artifacts in the decoded output image approximation.

Figure 1:
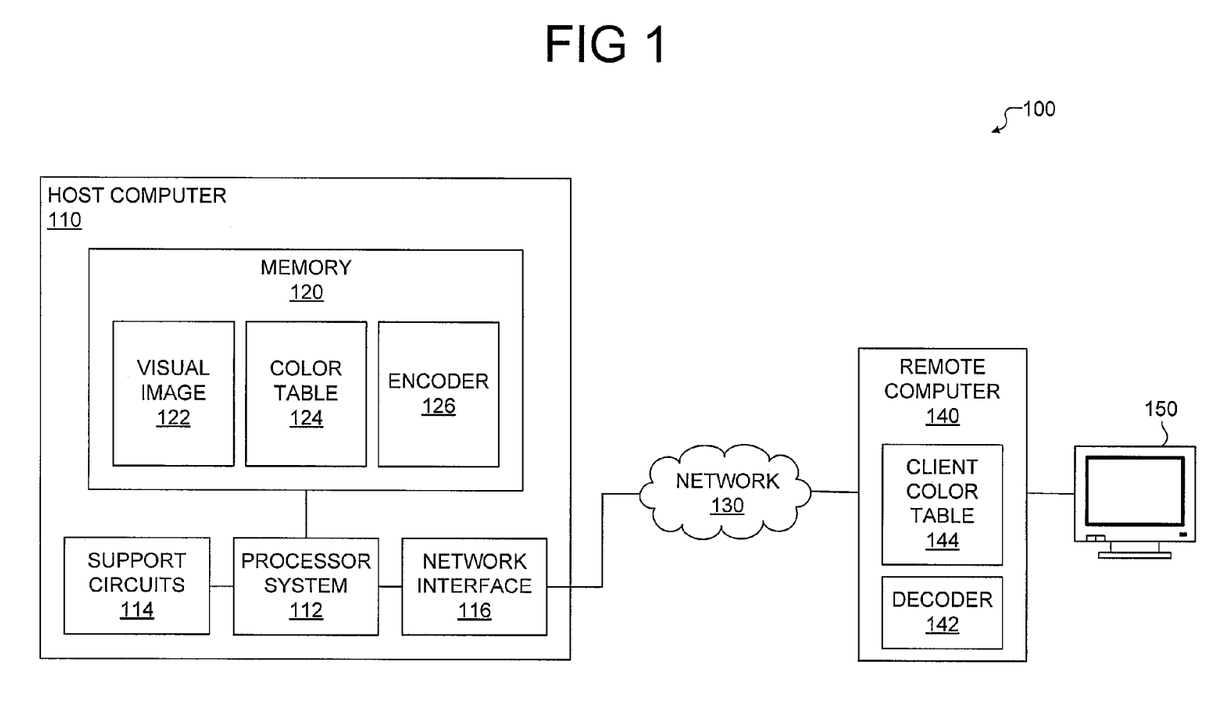
FIG. 1 is a block diagram depicting select details of a remote display system in accordance with one or more embodiments of the present invention.

FIG. 1 is a block diagram depicting select details of a remote display system 100 in accordance with one or more embodiments of the present invention. The remote display system 100 ("system 100") comprises host computer 110 coupled to a remote computer 140 by network 130. In an embodiment, host computer 110 includes hardware elements, such as processor system 112, network interface 116, memory 120 and support circuits 114, in addition to software encoder 126 and data structures, such as visual image 122 and color table 124 in memory 120. FIG. 1 portrays only one of numerous possible network configurations. For example, in some embodiments, system 100 comprises several remote computers, each associated with different domains of host computer 110. In other embodiments, system 100 comprises more than one processor system 112. For simplicity and clarity, only one processor system 112, and only one remote computer 140 are depicted and described. Embodiments of the invention, as shall be discussed below, include a method for encoding visual image 122 for communication to remote computer 140, where the received encoded image is decoded and presented for display on display apparatus 150.

Network 130 comprises a communication system, such as the Internet, LAN, WAN, or the like, that connects computer systems completely by wire, cable, fiber optic, and/or wireless links facilitated by various types of well-known network elements, such as connection brokers, Network Address Translation (NAT) gateways, hubs, switches, routers, firewalls, and the like. The network 130 may employ various well-known protocols, such as security protocols, to communicate information amongst the network resources.

Host computer 110 is, generally, a computer or system of computers that has been designated for encoding visual images. In an exemplary embodiment, host computer 110 executes operating system software, drivers, application software, and visual image encoding software in one or more operating system domains. In such an embodiment, the operating system typically comprises a well known operating system, such as a WINDOWS operating system from MICROSOFT Inc., an OSX operating system from APPLE Inc., or a LINUX or UNIX operating system available from many vendors. The operating system is typically supported by well known graphics drivers enabled to generate and maintain visual image 122. Examples of such graphics drivers include OPENGL from SILICON GRAPHICS corporation, DIRECTX from MICROSOFT CORPORATION, or image composition software, such as the WINDOWS VISTA Desktop Windows Manager (DWM) or QUARTZ from APPLE CORPORATION.

In some embodiments, several operating systems are executed within the host computer 110 as virtual machines (VMs) under supervision of a hypervisor, where the hypervisor coordinates the execution schedule and manages memory resources of each VM. Examples of commercially available hypervisor products include VMWARE ESX SERVER from EMC Corporation, XENSERVER from CITRIX Corporation, HYPER-V from MICROSOFT Corporation, and products such as the VIRTUAL IRON Hypervisor based on open source XEN source code.

Application software of host computer 110 generally comprises one or more executable applications with image display presentation or storage requirements, such as word processing software, spreadsheets, email, web browser, financial data presentation, video or photo display or editing software, graphics software (such as Computer Aided Design (CAD) software), Desktop Publishing (DTP) software, digital signage software, or the like. Such applications generate or retrieve (from memory 120) graphical information in the form of pixel data, graphics commands, video information, and the like. For example, host computer 110 may execute multimedia applications, such as ITUNES or QUICKTIME from APPLE CORPORATION, WINDOWS MEDIA PLAYER from MICROSOFT CORPORATION, and/or utility applications, that provide visual image 122 for presentation on display apparatus 150.

Processor system 112 is generally a processor designated to execute the encoding functions provided by encoder 126 for compressing visual image 122. In one set of embodiments, processor system 112 comprises industry compliant Central Processing Unit (CPU) and/or Graphic Processing Unit (GPU) resources typically supported by north bridge, south bridge, and/or other chipset components known to the art. Examples of a well known suitable CPU include mobile, workstation, or server class processors, such as 32-bit, 64-bit or other CPUs, including OPTERON, ATHLON, or PHENOM class microprocessors manufactured by AMD Corporation, XEON, PERYN, PENTIUM, or X86 class processors manufactured by INTEL, and SPARC or PowerPC™ microprocessors manufactured by SUN MICROSYSTEMS Inc. and Motorola, respectively. Suitable GPUs include integrated or external graphics processors, such as RADEON class GPUs from AMD Corporation, GEFORCE class GPUs from NVIDIA Corporation, or similar GPU processors provided by corporations such as INTEL or VIA Corporation. FIG. 1 portrays only one variation of many possible configurations of processor system 112. In some embodiments, processor system 112 comprises multiple CPU cores or separate CPUs, for example, interconnected by PCI-EXPRESS infrastructure, a HYPERTRANSPORT fabric, or the like, with memory 120 distributed accordingly.

Processor system 112 is coupled to memory 120 by one or more memory buses and/or system buses. In an embodiment, memory 120 comprises any one or combination of volatile computer readable media (e.g., random access memory (RAM), such as dynamic RAM (DRAM), static RAM (SRAM), eXtreme Data Rate (XDR) RAM, Double Data Rate (DDR) RAM, and the like) and nonvolatile computer readable media (e.g., read only memory (ROM), hard drive, tape, CDROM, DVDROM, magneto-optical disks, erasable programmable read only memory (EPROM), electrically erasable programmable read only memory (EEPROM), Flash EPROM, and the like). Moreover, memory 120 may incorporate electronic, magnetic, optical, and/or other types of storage media. In an exemplary embodiment, the memory 120 stores executable software, including encoder 126, in the form of machine-readable instructions and various data structures, including visual image 122 and color table 124, in the form of designated memory regions, typically allocated by operating system and application software functions.

Visual image 122 comprises a set of pixel data, such as Red, Green, Blue (RGB), Cyan, Magenta, Yellow and Key black (CYMK) or chrominance-luminance (YUV) pixel data typically ordered in raster or block sequence located in one or more regions of memory 120 that have been designated for the storage of such pixel data. In some such embodiments, visual image 122 represents at least part of a computer desktop display image, including part or all of application-related images such as photographs, video sequences, web browser interfaces, or productivity software Graphical User Interfaces (GUIs) (e.g., word processor, database, spreadsheet, and the like). In some cases, visual image 122 is distributed as multiple logical entities across non-contiguous memory, such as front and back frame buffers, multiple display windows where each window corresponds to a separate display of a multi-display system, or independent visual images generated by different virtual machines.

In various remote desktop display applications, software and graphics drivers periodically update parts of visual image 122 when pixel values change, for example responsive to user interaction. In some such embodiments, memory 120 comprises a binary mask (i.e., 'dirty mask') for tracking the location of pixels that have changed subsequent to a previous encoding iteration. Such a mask enables encoder 126 to selectively encode portions of visual image 122 rather than the complete image, resulting in reduced network bandwidth consumption.

Figure 4A:
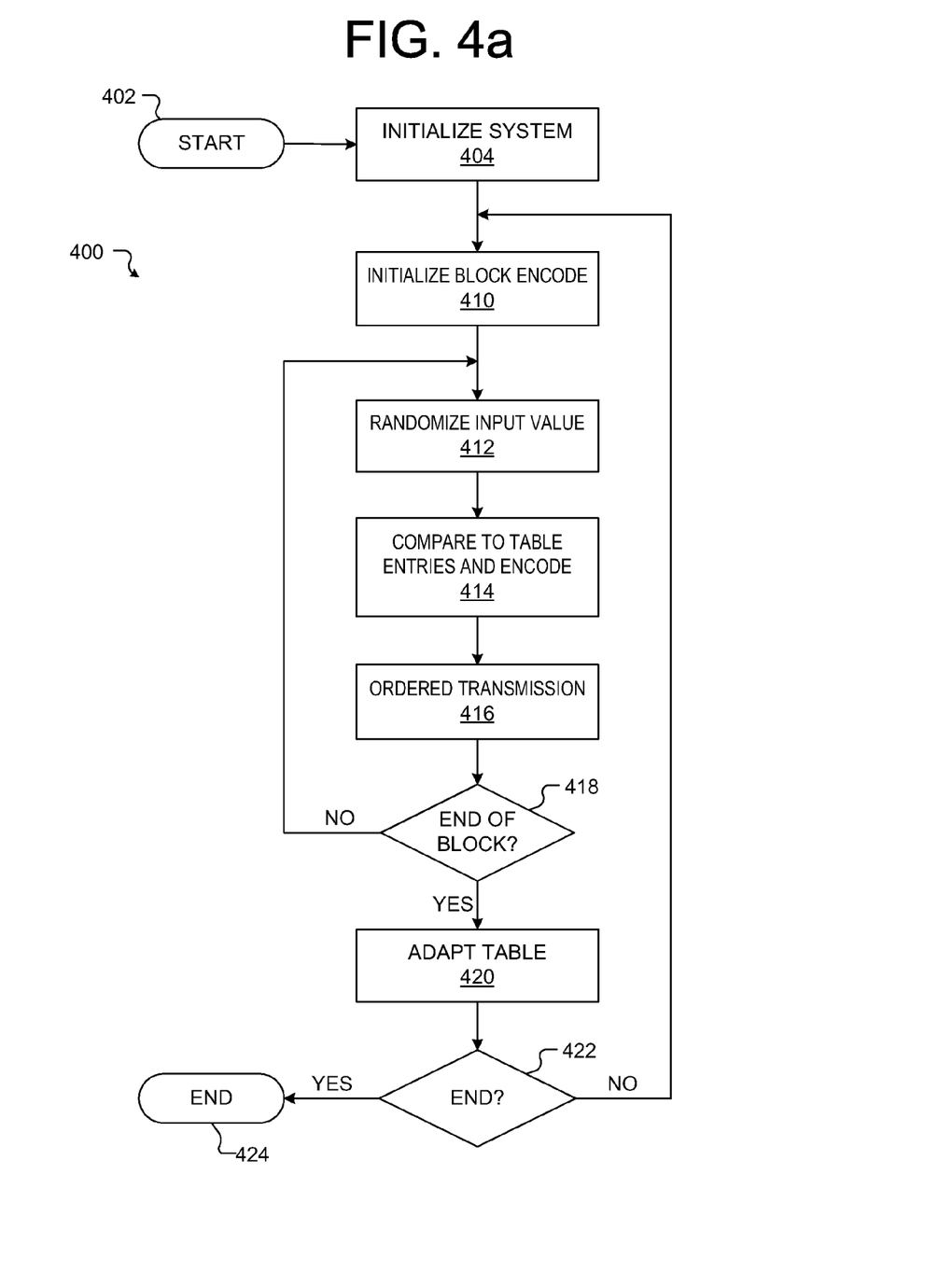
FIGS. 4A and 4B are block diagrams of a method for encoding and transmitting a visual image sequence and a method for decoding and displaying the transmitted visual image sequence, respectively, in accordance with one or more embodiments of the present invention.
Figure 6:
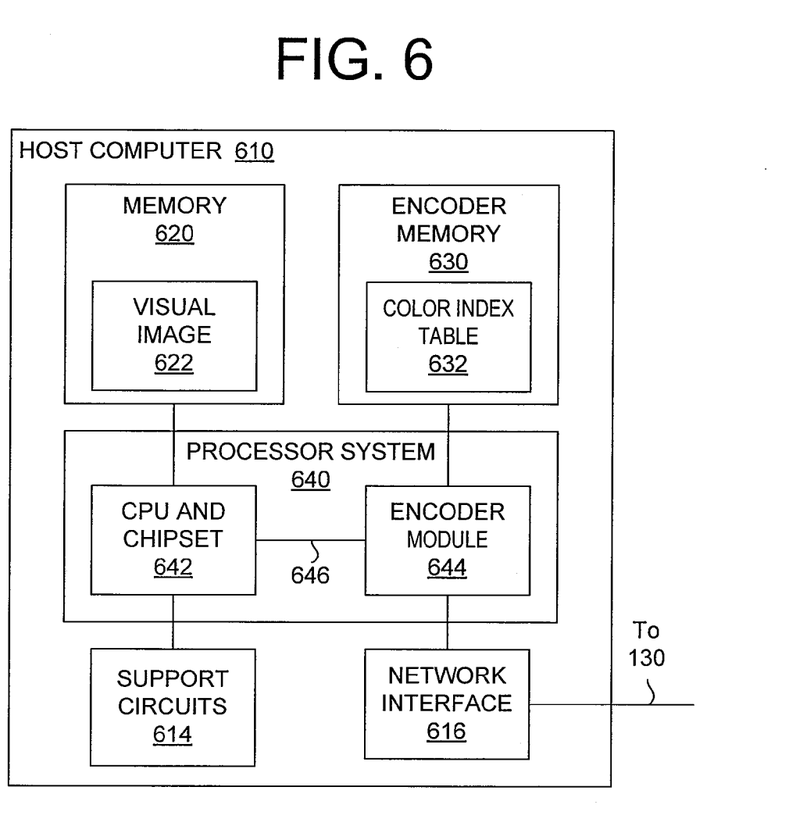
FIG. 6 illustrates select details of an alternative embodiment of a host computer comprising an encoding module.

Encoder 126 comprises a set of functions for compressing visual image 122 using color table 124 in conjunction with dynamic color index encoding methods described by the present disclosure in addition to functions for providing lossless encoding, such as Golomb exponential encoding functions or Golomb-Rice encoding functions. In an embodiment, encoder 126 comprises a set of machine executable instructions that are accessed and executed by processor system 112. Select details of such an encoding process are depicted in FIG. 4a and described below. Select details of an alternative host computer comprising an independent co-processing encoder module are depicted in FIG. 6.

Figure 2:
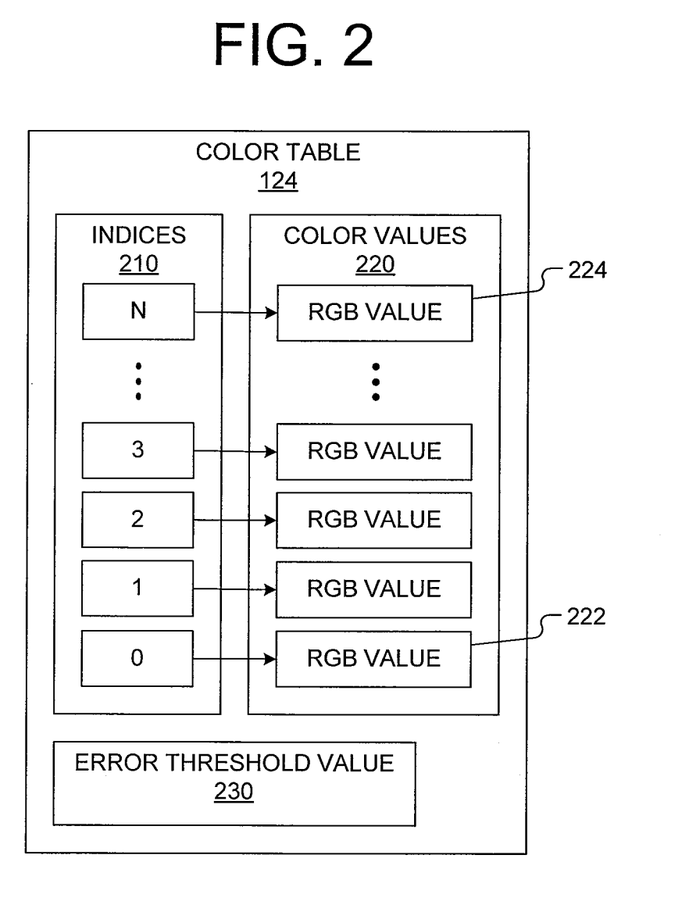
FIG. 2 depicts details of a color table in accordance with one or more embodiments of the present invention.

Color table 124 generally comprises an ordered list of pixel values associated with recently encoded pixel color values of visual image 122. An example of such a memory data structure is depicted in FIG. 2 and described below.

In various embodiments, host computer 110 comprises network interface 116 for providing connectivity to network 130. Network interface 116 comprises physical layer elements, such as data transceivers and higher layer protocol functions, for maintaining a network connection with remote computer 140. Network interface 116 may utilize network services in the form of software functions stored in memory 120 for providing protocol support, such as TCP/IP and security functions.

In various embodiments, processor system 112 and memory 120 are coupled with the aid of support circuits 114. Such support circuits 114 may include power supplies, clock circuits, data registers, I/O interfaces address, control, interrupt and/or data connections, controllers, data buffers, drivers, repeaters, and/or receivers to enable appropriate communications within host computer 110. In some embodiments, support circuits 114 incorporate hardware-based virtualization management features, such as emulated register sets, address translation tables, interrupt tables, PCI I/O virtualization (IOV) features, or I/O memory management unit (IOMMU), to enable Direct Memory Access (DMA) operations between processor system 112 and memory 120.

Figure 3:
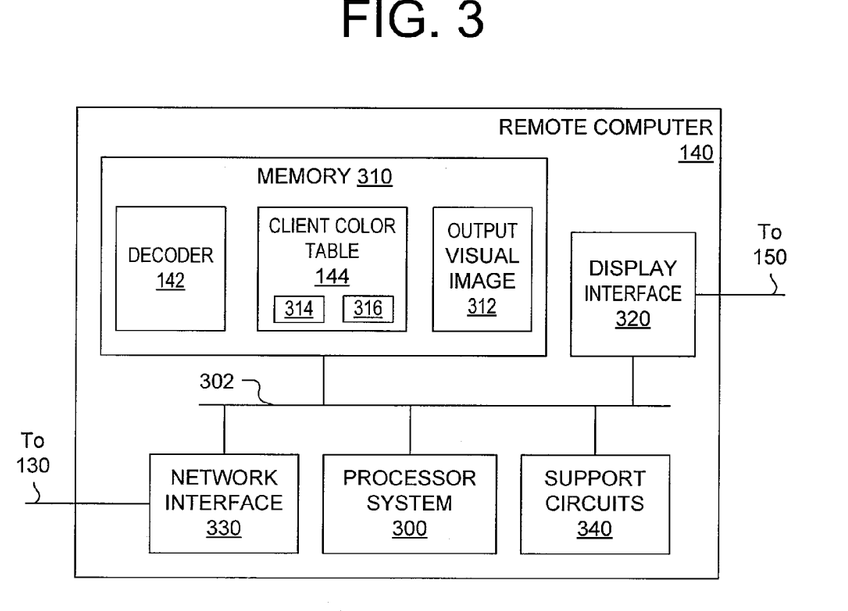
FIG. 3 illustrates select details of an embodiment of a remote computer.

Remote computer 140 is, generally, a computing device enabled to provide remote display functions, such as presenting a computer desktop image for display, providing ports for connecting display 150, and providing a network interface for connection to network 130. For example, in an embodiment, remote computer 140 is a terminal in a networked computer system (e.g., remote display system 100). Examples of such remote terminals include thin client or zero client computers, intelligent displays, personal computers, notebook computers, workstations, Personal Digital Assistants (PDAs), wireless devices, and the like. Remote computer 140 comprises decoder 142 which operates in conjunction with client color table 144 to decode compressed display image data received from the host computer 110, generally associated with a remote display session. Select details of an embodiment of remote computer 140 are depicted in FIG. 3.

According to various embodiments, display 150 is coupled to remote computer by a suitable cable and display image protocol, such as Video Graphics Array (VGA), Digital Visual Interface (DVI), or DISPLAYPORT. In an embodiment, display 150 is one or more of a Liquid Crystal Display (LCD) display, a Cathode Ray Tube (CRT) display, a plasma display, and/or any other type of display capable of displaying one or more images. For example, in some embodiments, display 150 is an Ultra eXtended Graphics Array (UXGA) display supporting a resolution of 1600×1200. In other examples, display 150 supports one or more of the VGA, high-definition television (HDTV), Super eXtended Graphics Array (SXGA), Super eXtended Graphics Array Plus (SXGA+), Quad eXtended Graphics Array (QXGA), Wide Extended Graphics Array (WXGA), and Wide Quad eXtended Graphics Array (WQXGA) display standards. In some embodiments, remote computer 140 is coupled to several displays to provide an extended desktop surface, or imbedded in a display 150 to reduce the remote computer footprint. It will be appreciated by those of ordinary skill in the art that host computer 110 and remote computer 140 may further comprise mechanical housing components, connectors, power supplies, and the like not depicted in FIG. 1.

FIG. 2 depicts details of a color table 124 in accordance with one or more embodiments of the present invention. Color table 124 generally comprises a set of indexed color values matching a selection of colors from a recently encoded section of visual image 122. Specifically, indices 210 comprise an ordered list of pointers (i.e., pointer 0, pointer 2, ... , pointer N) to a set of recently matched color values 220. Color values 220 are specified as numerical pixel values in RGB, YUV, CMYK or other color domains. The indices themselves are typically represented as encoded values in color table 124 (e.g., Golomb encoding) which makes them predisposed to optimal run-length encoding. In an embodiment, the color values 220 of color table 124 are ordered on a Least Recently Used (LRU) basis with the first index (i.e., pointer 0) pointing to the most recently used color value 222 and the last index in color table 124 (i.e., pointer N) pointing to the least recently used color value 224.

Error threshold value 230 is a programmable value that specifies an allowable error range associated with a color match. In select RGB embodiments (i.e., color values 220 comprising a set of RGB color values as depicted in FIG. 2), error threshold value 230 comprises either Red, Green and Blue error range components or an aggregated error range value for combined Red, Green and Blue components, in either case suitably weighted to match Human Visual System (HVS) response criteria. In some alternative embodiments, error threshold value 230 comprises a list of thresholds, each value associated with an image type, a target compression ratio, or a subset of the indices 210. In other embodiments, error threshold value 230 is periodically adjusted to tune the image compression ratio based on requirements such as network bandwidth availability or image type information. In an exemplary embodiment, error threshold value 230 comprises a random value (related to the minimization of artifacts), which may comprise a spatial integration factor, added to a programmable non-integrated constant component (to support tuning operations) that is isolated from being randomized out over some area of pixels.

In some embodiments, the dimensions of color table 124 (i.e., number of indices 210) is programmable to enable the computation load of the encoder 126 to be tuned. As one example, the number of indices 210 may be set to eight indices during periods when minimal encoder-related computation is desired, set to twelve indices during periods when nominal encoder-related computation is desired, and set to 16 indices during periods when encoder-related computation can be maximized.

FIG. 3 illustrates select details of an embodiment of a remote computer 140. Remote computer 140 comprises processor system 300, memory 310, display interface 320, network interface 330, and support circuits 340 communicatively coupled by bus 302. It will be appreciated by those of ordinary skill in the art that in an embodiment such as a thin client or desktop PC, remote computer 140 may further comprise mechanical housing components, connectors, power supplies, and the like not illustrated in FIG. 3. Remote computer 140 may be implemented, at least in part, as a processor, a computer system, and/or a programming or a processing environment configured to receive, decode, and display color-indexed image data, such as encoded sections from a sequence of image frames or image regions. Remote computer 140 may also include one or more of Human Interface Devices (HIDs); peripheral components, such as microphones or speakers; other interfaces, such as a USB interface; and other components, interfaces, and/or connections associated with computer systems, desktop computers, and/or processors. In various embodiments, remote computer 140 is a processing module integrated in an appliance, such as a phone or a display apparatus. In some such embedded implementations, remote computer 140 may be configured to use resources, such as power supply and mechanical support components, provided by the related appliance.

According to various embodiments, bus 302 is one or more of a Peripheral Component Interconnect (PCI) bus; a PCI-EXPRESS bus; an Advanced Microprocessor Bus Architecture (AMBAC) bus; and any other connections, including wired, wireless, and optical connections, for coupling components of remote computer 140. In some embodiments, bus 302 includes communications elements, such as controllers, data buffers and/or registers, drivers, repeaters, receivers, and connections including address, control, and data connections, to enable communications among components of remote computer 140. According to various embodiments, bus 302 is one or more of a single bus; a plurality of independent busses, with some of the components of remote computer 140 coupled to more than one of the independent buses; a plurality of bridged busses; a fabric, and any other one or more busses configured to couple the components of remote computer 140.

Processor system 300 is a microprocessor, microcontroller, or logic sequencer enabled to provide control and/or management functions for remote computer 140 and further enabled to execute image decoding and display functions. Examples of processor 300 include 16-bit, 32-bit, or 64-bit CPUs from manufacturers such as INTEL, AMD, or VIA Technologies; and any other suitable processor or computing device, such as a MIPS or ARM embedded processor suited to Application Specific Integrated Circuit (ASIC), Field Programmable Gate Array (FPGA) or programmable digital media processor implementations of remote computer 140. Such ASIC or FPGA implementations may be configured, at least in part, as a logic circuit and/or software executing on and/or in conjunction with a processor to perform image decoding techniques of decoder 142.

Memory 310 comprises random access memory, read only memory, removable disk memory, flash memory such as one or more of electronic, magnetic, optical, and/or other types of storage media; volatile computer-readable media, such as RAM, DRAM, SRAM, DDR RAM or XDR RAM; and non-volatile computer-readable media, such as ROM, hard drive, tape, CDROM, DVDROM, magneto-optical disks, EPROM, EEPROM, Flash EPROM, or various combinations of these types of memory for storing data and/or computer-readable instructions. Memory 310 stores various software, firmware, and/or data structures including decoder 142, client color table 144, and output visual image 312. In some embodiments, memory 310 further comprises operating system software components, bus drivers, device drivers, and the like. In various embodiments, memory 310 is partitioned and/or distributed. For example, in some embodiments, memory 310 is partitioned into a plurality of partitions, such as system and frame buffer partitions, and the frame buffer partition is accessible by display interface 320. In some embodiments, memory 310 uses different busses for coupling with network interface 330, processor system 300, display interface 320, and/or other components of remote computer 140, and includes control logic for arbitrating access to memory 310 among the components of remote computer 140.

In various embodiments, display interface 320 retrieves output visual image 312 from memory 310, and provides a display signal, such as a raster signal, for display 150 using a suitable display signaling protocol. In some DVI embodiments, display interface 320 includes line driver circuitry, such as Transition-Minimized Differential Signaling (TMDS) circuitry. In other embodiments, display interface 320 includes one or more VGA or DISPLAYPORT controllers and uses alternative display protocols, such as DISPLAYPORT, Digital Packet Video Link (DPVL), High-Definition Multimedia Interface (HDMI), or the like.

Network interface 330 generally receives an encoded image stream from host computer 110 for decoding and presentation. In one embodiment, the network interface 330 provides compatibility with the network 130 by executing a reliable communication protocol, such as TCP/IP. Support circuits 340 include at least one of power supplies, clock circuits, data registers, I/O interfaces, network interfaces, and the like. The support circuits 340 support the functionality of processor 300, bus 302, memory 310, display interface 320, network interface 330, and other components of remote computer 140.

Decoder 142 comprises functions for decompressing encoded image data received from host computer 110 and generating output visual image 312 using client color table 144 in conjunction with color index decoding methods, an embodiment of which is depicted as process 450 in FIG. 4. In an embodiment, decoder 142 comprises a set of machine executable instructions that are retrieved from memory and executed by processor system 300.

Client color table 144 generally comprises an ordered list of pixel color values 314 referenced by a set of indices 316. The pixel color values 314 in client color table 144 are associated with recently decoded pixel values of output visual image 312. In an embodiment, such a list comprises a set of indices, each index associated with an RGB pixel value. Output visual image 312 comprises a set of pixel data, representing an approximation of the source visual image 122, stored in a format such as RGB, YUV, or CMYK in one or more regions of memory 310, such as one or more frame buffers associated with one or more display devices.

In some embodiments, various combinations of all or portions of functions performed by a computer (such as computers 110 or 140), and portions of a processor, a microprocessor, or a programmable controller providing all or portions of the aforementioned functions, are specified by descriptions compatible with processing by a computer system (e.g., Verilog, VHDL, or any similar hardware description language). In various embodiments, the processing includes any combination of interpretation, compilation, simulation, and synthesis to produce, to verify, or to specify logic and/or circuitry suitable for inclusion on an integrated circuit. The integrated circuit, according to various embodiments, is designed and/or manufactured according to a variety of techniques. The techniques include a programmable technique (such as a field or mask programmable gate array integrated circuit), a semi-custom technique (such as a wholly or partially cell-based integrated circuit), and a full-custom technique (such as an integrated circuit that is substantially specialized), any combination thereof, or any other technique compatible with design and/or manufacturing of integrated circuits.

Figure 4B:
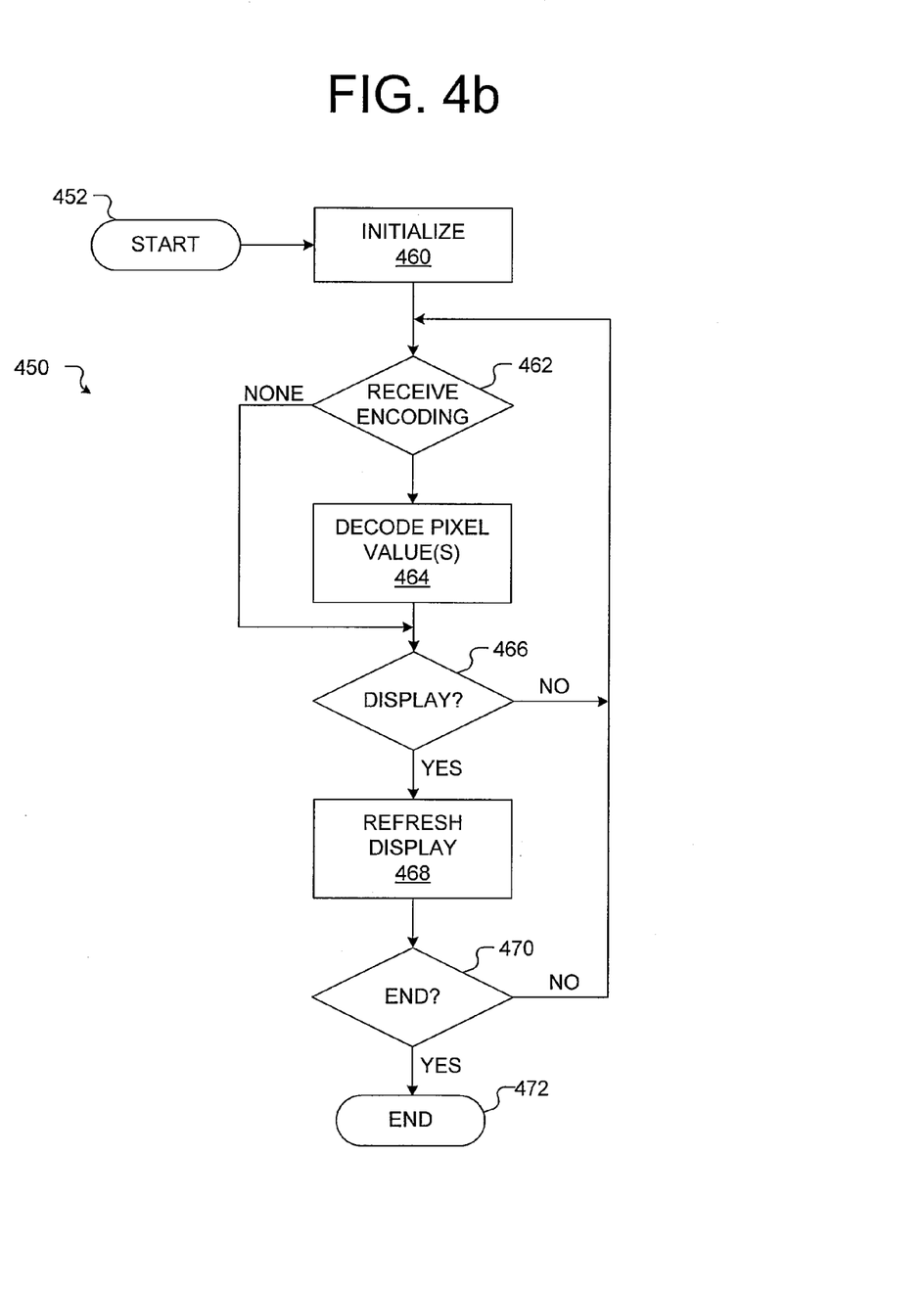

FIGS. 4A and 4B are block diagrams of a method 400 for encoding and transmitting a visual image sequence and a method 450 for decoding and displaying the transmitted visual image sequence, respectively, in accordance with one or more embodiments of the present invention. The method 400 is executed by host computer 110, and the method 450 is executed by remote computer 140.

Referring to FIG. 4a, the method 400 starts at step 402 ("Start") and proceeds to step 404 ("Initialize System"). In an embodiment, a host computer (e.g. host computer 110) is initialized and communication with remote computer 140 is established. Encoder 126 is initialized and visual image 122 is generated in memory 120. Generally, visual image 122 continues to be updated by processor system 112 by computational processes independent of the method 400. Encoder 126 instantiates color table 124 and initializes error threshold value 230, for example, using a default value, an initial target compression ratio, or determined attributes of the initial visual image 122.

The method 400 proceeds to step 410 ("Initialize Block Encode"). The color values 220 are initialized as one or more color values, such as a single common color value (for computation efficiency), a spectrum of colors (such as a set of saturated color values likely used in a text image), a set of color values distributed across a color spectrum, or an historic set of colors for compression efficiency (e.g., related to a previously encoded close-proximity section). Encoder 126 selects and retrieves an image section, such as a block of 16×16 pixels or alternative suitably dimensioned section, from visual image 122. In various embodiments, the order of block (i.e., image section) selection is based on factors such as time elapsed since a block has changed, encoding priority information (for example, related to image type information or user interaction), raster scan sequence, or the like. In some embodiments, 'dirty mask' techniques known to the art are used to prevent unnecessary redundant retrieval, re-encoding, or the retransmission of unchanged sections of visual image 122. In other embodiments, visual image 122 is decomposed into various image types (such as picture image, background image, text image, high contrast image types, and the like) prior to encoding such that different encoding parameters (e.g., different values for error threshold value 230) can be used when encoding the different image types.

The method 400 proceeds to step 412 ("Randomize Input Value"), where an 'input pixel' (i.e., the first or next input pixel value in a sequence, such as a zigzag or raster sequence) of the block retrieved in step 410 is randomized to minimize contour artifacts in an output image approximation presented on display 150. Such pixel value randomizing techniques include error diffusion and ordered dithering algorithms. One approach based on error diffusion accumulates the residual error from previous comparisons, which is factored into the next pixel value comparison operation (ref. step 414) as an integrated residual error. Long term error compensation is achieved by adjusting the input pixel value by the integrated residual error when a range miss is encountered (i.e., no matching colors 220). While error integration is generally more expensive from a computational view than ordered dithering methods, it provides improved performance for select image types, such as images comprising flat tints or gradients. An alternative approach uses ordered dithering without error integration by adding a random value to the pixel value ahead of the comparison with color values in color table 124. R, G, and B may each receive independent weighted scaling, with G usually comprising the opposite sign to R and B to reduce luma error. Another alternative approach applies both error diffusion and ordered dithering by simultaneously controlling both the randomization effect of ordered dithering and the integration effect of error diffusion according to image type information determined during prior image analysis. In one such embodiment, error diffusion is applied to images of picture type in which transition regions such as edges are smoothed by dithering while ordered diffusion is applied to high contrast images where smoothing is undesirable. Such high contrast images include text image types in which a fast response and exact colors are important to preserve image features. In some embodiments, the level of randomization applied to the input pixel value is adjusted in response to a predicted or measured change in image type, network bandwidth availability, or administrative settings.

The method 400 proceeds to step 414 ("Compare to Table Entries and Encode"), where the randomized input pixel value (per step 412) is compared to the color values 220 of color table 124. The randomized input pixel value, optionally weighted by an integrated error value, is encoded according to whether a table hit (i.e., a color match) or a table miss is determined, producing an encoded pixel value according to the outcome of the comparison. An embodiment of such a comparison and encoding method is depicted as the method 500 in FIG. 5.

The method 400 proceeds to step 416 ("Ordered Transmission"), where the encoded image data from step 414 and block reference information (generally stored in memory 120 as a set of identifiers associated with visual image 122) are communicated to the remote computer, typically maintaining the encoded image data order used in step 414 for the table comparison. The encoded image data may be queued for later transmission, which enables data associated with multiple encoded pixels to be aggregated in network packets and reduces block reference and packet header overheads.

As a next step 418 ("End of Block?"), method 400 determines if the last input pixel in the current block has been processed. If not, the method 400 returns to step 412 and the next input pixel in the block is encoded. If encoding of the current block is complete, the method 400 proceeds to step 420 ("Adapt Table") for embodiments in which table adaptation is performed. If no table adaptation is performed, process 400 proceeds to step 422.

Generally, step 420 tunes the color table 124 to adjust at least one of compression ratio, processing efficiency, or color accuracy of the output visual image (i.e. display color accuracy) in response to a change in image type or a predicted or measured change in environmental parameters, such as network bandwidth availability or administrative settings. For example, the error threshold may be decreased if the ratio of color table hits is high in order to increase image quality without substantial change to the network bandwidth. In an embodiment, error threshold value 230 is adjusted to change the compression ratio of encoder 126 towards a target compression ratio. One method of determining the actual compression ratio achieved by encoder 126 is to measure the Bits-per-pixel (bpp) ratio between the encoded image data and the uncompressed input block. An alternative computationally efficient approach maintains a history of the number of table misses resultant from the comparison operation of step 414. Table 1 shows various responsive remedies in the form of table adaptations to various environmental changes.

TABLE 1

Environmental Parameters and Adaptations

| Environmental Parameter Change | Table Adaptation |
| --- | --- |
| Increased CPU availability for encoder | Increase number of table indices 210. (i.e. Increase table dimension) |
| Decreased CPU availability for encoder | Decrease number of table indices 210. (i.e. Decrease table dimension) |
| Increased network bandwidth availability for encoded image | Decrease value of Error Threshold value 230 |
| Decreased network bandwidth availability for encoded image | Increase value of Error Threshold value 230 |
| Increase display image quality specification under constrained CPU availability | Decrease value of Error Threshold value 230 |
| Decrease display image quality specification under constrained CPU availability | Increase value of Error Threshold value 230 |
| Increase display image quality specification under unconstrained CPU availability | Increase number of table indices 210. (i.e. Decrease table dimension) |
| Decrease display image quality specification under unconstrained CPU availability | Decrease number of table indices 210. (i.e. Decrease table dimension) |
| Image Type Change | Increase value of Error Threshold value 230 for picture image types. Decrease value of Error Threshold value 230 for text or high contrast object picture types. |

Table 1 Notes:
 a) CPU Availability provides a measure of the proportion of CPU processing cycles available to executing encoder 126. Such a measure is provided by a performance monitoring tool, processing statistics, or the like.
 b) Network bandwidth availability provides one or more measures of the availability of the various data paths between memory 120 and remote computer 140, including memory bandwidth availability and attributes of network 130 (including congestion level, network error statistics, or latency indicators).
 c) The display image quality specification provides a specification of desired image quality (measured, for example, in terms of peak signal-to-noise ratio (PSNR) or perceptual quality indicators) based on the evolving attributes of visual image 122 (e.g., image type information) or administrative settings. In an embodiment, image features such as text and high-contrast objects demand a high perceptual quality, whereas perceptual quality related to image features such as pictures, backgrounds, and video images can be decreased in favor of a reduced burden on CPU availability.
 d) In some embodiments, select image areas (such as background areas or areas of solid colors) are detected using image decomposition techniques, such as filters or graphic command analysis. Such select image areas are encoded as lossless image data to maximize the color accuracy of the output visual image. In some such embodiments, separate color tables are implemented to encode different image types, which ensures lossless encoding of specified image areas.

If the number of table indices 210 is adapted, the client color table 144 need not be adjusted under certain assumptions. Firstly, color table 124 should not be longer than the client color table 144, and, secondly, a matching LRU algorithm (such as described in process 500) below should be used to maintain table currency. The method 400 proceeds to step 422 ("End?"), where is the method 400 determines if the method 400 should be terminated, for example on termination of a connection between the host computer and the remote computer (in which case the method 400 ends at step 424 ("End")), or if additional encoding is required, for example if additional blocks of the visual image require encoding or if the visual image is updated, in which case the method 400 returns to step 410 to process the next block.

Referring now to FIG. 4b, method 450, which is executed at remote computer 140, starts at step 452 ("Start") and proceeds to step 460 ("Initialize"). In an embodiment, remote computer 140 is initialized and communications with host computer 110 is established. Processor system 300 (ref FIG. 3) initializes decoder 142. Output visual image 312 in memory 310 is initialized, for example by loading a local splash screen image from memory 310. Client color table 144 is instantiated and initialized to correspond with the initialized state of color table 124 of the host computer 110.

Method 450 proceeds to step 462 ("Receive Encoding?"), where encoded image data and block reference information is extracted from one or more network packets received from host computer 110. If no new is data is available at the host computer 110 for encoding, and hence no encodings received at the remote computer 140, method 450 proceeds to step 466. In an embodiment such as process 500 depicted in FIG. 5 and described below, the received encoded image data comprises either a new color value or an index to an existing color value in client color table 144 as determined by encoder 126. In various embodiments where color indexing is accompanied by some form of run length encoding, the image data extracted from a single network packet typically generates multiple output pixel values from a block of the image.

Method 450 proceeds to step 464 ("Decode Pixel Value(s)") where one or more pixel values are derived from the encoded image data for the referenced block and pixel locations, the pixel locations typically defined implicitly by the pixel processing order at the host computer. In an embodiment, a color pixel value or one or more color indices is extracted using entropy decoding steps complementary to entropy encoding operations specified for step 414 of the method 400. Decoder 142 uses decoded color indices to reference and extract previously stored color values from client color table 144. The color values extracted from the client color table 144 or the network packet (in case of a new color) are stored at specified block locations of output visual image 312. Client color table 144 is updated such that represented color values and ordering reflect the represented colors and ordering of color table 124, for example, according to an LRU sorting algorithm corresponding to a matching sorting algorithm deployed at the host computer. Table ordering is generally updated each time a new color is encountered. The new color is either re-located to the lowest entry position in the client color table 144 from elsewhere in the table, or, if newly received, posted at the lowest entry position in the client color table 144 (in which case the least recently used value is purged from the client color table 144).

Method 450 proceeds to step 466 ("Display?"), where it is determined (for example, by a display controller timing function of display interface 320) if the latest output image should be displayed. If no immediate display refresh is required, method 450 returns to step 462. If a display refresh cycle is required, method 450 proceeds to step 468 where display 150 is refreshed with output visual image 312. Method 450 proceeds to step 470 ("End?"), where it is determined if method 450 should be terminated, for example, on completion of a remote display session, and in which case method 450 ends at step 472 ("End"). If additional decoding and display steps are required, method 450 returns to step 462 to process additional encoded image data.

Figure 5:
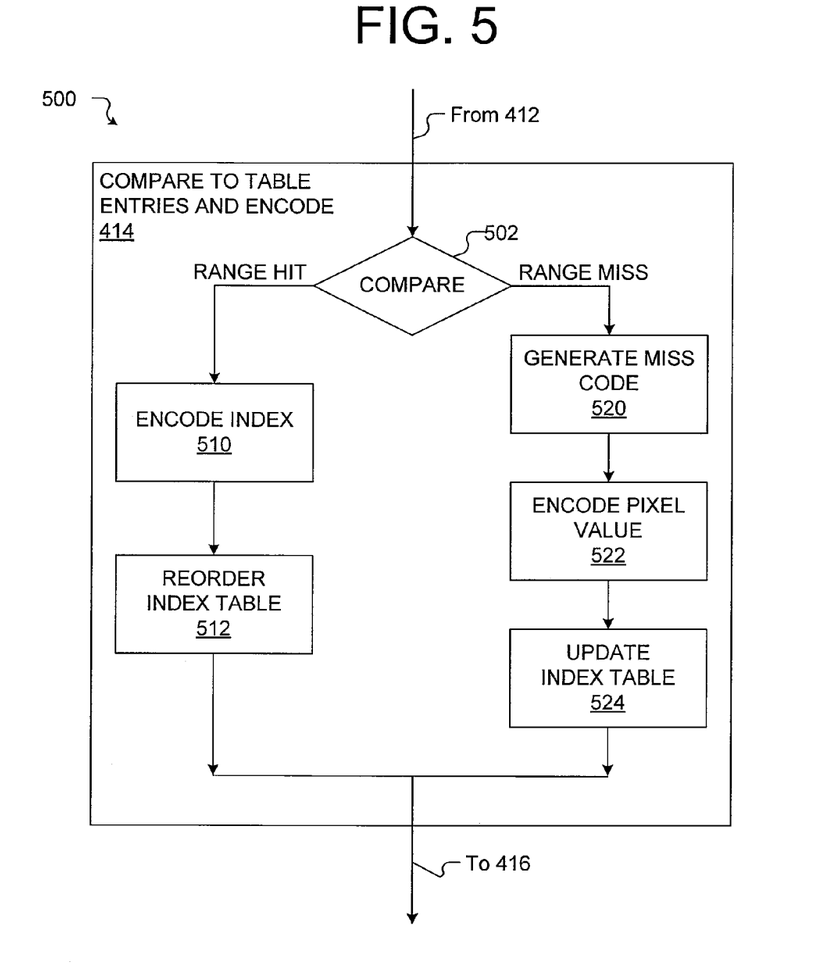
FIG. 5 is a block diagram of a method illustrating an embodiment of comparing randomized input pixel values to color values of a color index table.

FIG. 5 is a block diagram of a method 500 illustrating an embodiment of comparing randomized input pixel values to color values of a color index table. The method 500 illustrates an embodiment of step 414 in FIG. 4 ("Compare to Table Entries and Encode"). Method 500 starts, subsequent to step 412 of the method 400, at step 502 ("Compare"), where the randomized input pixel value is compared to the color values 220 of color table 124. In select cases, long term compensation of residual quantization is factored into the comparison operation, for example, by adjusting color values 220 in the color table 124 by the integrated residual error prior to comparison with the randomized input pixel value.

In various RGB embodiments, separate R, G, and B component error values are computed between the randomized input pixel value's R, G, and B components and the components of the most recent color value entry 222 in color table 124, followed by a comparison with error threshold value 230 to determine whether a color value hit is established. In some embodiments, the randomized R, G and B components of the input pixel value are weighted by HVS response criteria prior to the comparison with error threshold value 230. In some such embodiments that use ordered dithering as a means for randomizing the input pixel value, the offset limit (i.e., maximum and minimum values) of the indices in the threshold map (e.g., index matrix or Bayer matrix) associated with the ordered dithering process is weighted by HVS response criteria and further adjusted responsive to changes in network bandwidth availability, image type, or display color accuracy requirements. In another embodiment, separate R, G and B errors are determined, the separate R, G and B errors are weighted according to HVS response criteria, and the weighted errors are compared to components of error threshold value 230. In another embodiment, separate R, G and B errors are determined and the separate R, G and B errors are compared to components of error threshold value 230 weighted according to HVS response criteria. In an embodiment, the error weighting is 4:2:1 for Green, Red and Blue components (i.e., red component error is weighted 2× blue component error, and green component error is weighted 2× red component error). If the aggregate error (or one or more of the component errors according to some embodiments) is greater than the error threshold value 230, the comparison is repeated between the randomized input pixel value and the next recently used color value in color table 124 until either a range hit is established or it is determined that there is a range miss (i.e., no color value hits in the entire color table 124). In some embodiments, encoder 126 comprises a pre-processing function that enables exact transmission of a specified color when required. In such embodiments, the pre-processing function forces a range miss rather than a set of table comparisons under specified circumstances, for example, in cases when exact background color is desired.

If, at step 502, it is determined that the randomized input pixel value is within range of any one of the color values 220 (i.e., if a range hit is determined), method 500 proceeds to step 510 ("Encode Index"). At step 510, the index (i.e., of indices 210) associated with the matching color is encoded using a lossless encoding technique, such as Golomb exponential encoding, Golomb-Rice encoding, or an alternative suitable entropy encoding method. In some embodiments, the encoding technique is changed to suit the observed distribution of color hits. As a next step 512 ("Reorder Index Table"), color values 220 in color table 124 are re-ordered, for example, using an LRU sorting algorithm known to the art. In some embodiments, the most recent match is assigned the lowest index, which ensures efficient exponential coding in cases when a block comprises a run of identical pixel values. Method 500 then proceeds to step 416 of the method 400.

If, at step 502, it is determined that the randomized input pixel value is not within range of any one of the color values 220 (i.e., if a range miss occurs), method 500 proceeds to step 520 ("Generate Miss Code"). At step 520, an indicator (i.e., a miss code) is inserted in the encoded image data to signal the decoder that subsequent data comprises an encoded color value rather than encoded index information. As a next step 522, the input pixel value (i.e., the pre-randomized input pixel value retrieved in step 412 of the method 400) is encoded for transmission using a suitable lossless encoding method known to the art. In some error diffusion embodiments providing long-term error compensation, the encoded pixel value (EPV) is computed as a derivative of the input pixel value in accordance with equation 1 shown below. The input pixel value (IPV) is adjusted in consideration of the current integrated residual error (IRE), typically weighted by a factor W. In some embodiments, a weighting factor W of ¼ is utilized to provide satisfactory long-term error compensation.

$$EPV = IPV + IRE \times W \qquad \text{[Equation 1]}$$

As a next step 524, color table 124 is updated with the color value of the input pixel. In various embodiments, the pre-randomized input pixel value (IPV), or alternatively, the encoded pixel value (EPV) is assigned an early position such as the lowest index in the color table 124, the highest entry in the color table 124 is purged, and an LRU algorithm is applied to sort the remaining color values. In one case, a weight W factor of zero is applied in Equation 1 such that the IPV is added to the color table. This approach may be used to apply a balance between error diffusion and ordered dithering by adjusting the weighting of the ordered dithering according to the desired magnitude of ordered dithering for values in the color table. In another embodiment, the encoder looks ahead in the input pixel sequence to determine if other color values in close color value proximity to the replacement color are queued for encoding. If such similar color values are present, the encoder stores a representative average color to increase the probability of a table hit when the similar queued pixels are encoded. In another embodiment, statistics related to the error associated with replacement colors (e.g., IRE value of equation 1) are maintained and replacement colors modified to increase the probability of a table hit. Method 500 then returns to step 416 of the method 400.

FIG. 6 illustrates select details of host computer 610, an alternative embodiment of host computer 110. Generally, host computer 610 is differentiated from host computer 110 by co-processing capabilities that offload at least part of the encoding function from the primary processor (ref. processor system 112).

Host computer 610 comprises processor system 640. Processor system 640 is supported by support circuits 614; support circuits 614 are similar to support circuits 114. Processor system 640 comprises CPU and chipset 642 coupled to encoder module 644 by a bus 646, such as a PCI-EXPRESS bus, a HYPERTRANSPORT bus, an image data bus (such as a DISPLAYPORT bus, a Digital Visual Interface (DVI) bus, or a USB bus), or a combination thereof. CPU and chipset 642 may comprise processor components as described for processor system 112. CPU and chipset 642 is attached to memory 620, which is structurally similar to memory 120. Memory 620 comprises visual image 622, which is substantially similar to visual image 122. Host computer 610 further comprises encoder memory 630, which comprises color index table 632. Color index table 632 is structurally similar to color table 124; however, unlike color table 124, color index table 632 is located in encoder memory 630 independent of primary CPU memory 620. In an embodiment, encoder memory 630 comprises any one or combination of volatile computer readable media (e.g., random access memory (RAM), such as DRAM, SRAM, XDR RAM, DDR RAM, and the like) and nonvolatile computer readable media (e.g., ROM, hard drive, tape, CDROM, DVDROM, magneto-optical disks, EPROM, EEPROM, Flash EPROM, and the like).

In an embodiment, encoder module 644 comprises a Field Programmable Gate Array (FPGA), Application Specific Integrated Circuit, System-on-Chip (SoC) device with image processing resources, at least part of a GPU or media processor (such a decision-oriented imaging pipeline), and low latency memory configured, at least in part, to execute the encoding functions provided by encoder module 644. In some embodiments, encoder module 644 comprises parallel processing structures, each structure comprising computation elements, memory, and a shared or independent color index table that enables simultaneous encoding of multiple blocks of visual image 622. Encoder module 644 is coupled to network interface 616 which provides network connectivity functions substantially similar to those of network interface 116. Alternatively, encoded data from module 644 is looped back to CPU and chipset 642 and transmitted to the remote computer 140 using a network interface under management of CPU and chipset 642.

While the foregoing is directed to embodiments of the present invention, other and further embodiments of the invention may be devised without departing from the basic scope thereof, and the scope thereof is determined by the claims that follow.

The invention claimed is:

1. A method for communicating an image section between a first computer and a second computer, the first computer adapted for remotely coupling to the second computer via a network, the method comprising:
    determining an image type of an input pixel value based on an analysis of the image section, the image type selected from a list comprising text and picture;
    determining an error threshold based on the image type;
    determining, by the first computer, a color table comparison result for the input pixel value, the color table comparison result identifying one of (i) an indexed color value of a color table, the indexed color value within the error threshold of the input pixel value, or (ii) an absence in the color table of any color value within the error threshold of the input pixel value;
    generating, based on the color table comparison result, encoded data comprising one of a derivative of the input pixel value or an index for the indexed color value;
    communicating, to the second computer, the encoded data;
    updating the color table according to the color table comparison result;
    repeating the steps of determining the color table comparison result, generating the encoded data and communicating the encoded data to determine a communication bandwidth of the encoded data; and
    adjusting the error threshold based on the communication bandwidth.

2. The method of claim 1, wherein the input pixel value comprises a pixel color value of a pixel retrieved in a defined sequence from the image section.

3. The method of claim 1, further comprising:
    generating, by the second computer, from the encoded data and a client color table, a display pixel related to the input pixel value; and
    updating the client color table according to the encoded data.

4. The method of claim 3, wherein updating the color table and updating the client color table comprises at least one of (i) storing the derivative of the input pixel value in the color table and the client color table or (ii) re-ordering the color table and the client color table.

5. The method of claim 1, wherein determining the color table comparison result comprises comparing a randomized value related to the input pixel value with at least one pixel color value in an ordered list of pixel color values in the color table.

6. The method of claim 5, wherein determining the color table comparison result further comprises selecting a first pixel color value in the ordered list of pixel color values approximating the input pixel value.

7. The method of claim 5, wherein determining the color table comparison result comprises determining the randomized value is within the error threshold of the indexed color value.

8. The method of claim 7, wherein at least one of (i) the randomized value is related to the input pixel value by an offset limit comprising color component value differences weighted by Human Visual System (HVS) response criteria, or (ii) the error threshold comprises the color component value differences weighted by the HVS response criteria.

9. The method of claim 8, wherein at least one of the offset limit or the error threshold is adjusted responsive to a change in at least one of network bandwidth availability, the image type, or display color accuracy requirements.

10. The method of claim 7, wherein the error threshold is adjusted based on a history of absences in the color table of any color value approximating the input pixel value.

11. The method of claim 5, wherein the randomized value comprises at least one of an error diffused value or a dithered value.

12. The method of claim 1, wherein the encoded data comprises an exponential encoding of the index.

13. The method of claim 1, wherein a dimension of the color table is adjusted responsive to computational load criteria.

14. The method of claim 1, wherein the derivative of the input pixel value comprises the input pixel value adjusted by an error value, the error value comprising integrated and weighted error values of previous input pixel values.

15. The method of claim 5, wherein updating the color table comprises inserting the derivative of the input pixel value into the ordered list at a first early position or moving the indexed color value to a second early position of the ordered list.

16. A non-transitory computer-readable medium having a set of instructions stored therein which, when executed by a processing device, causes the processing device to perform procedures comprising:

determining an image type of an input pixel value based on an analysis of an image section, the image type selected from a list comprising text and picture;

determining an error threshold based on the image type;

determining a color table comparison result for the input pixel value, the color table comparison result identifying one of (i) an indexed color value of a color table, the indexed color value within the error threshold of the input pixel value, or (ii) an absence in the color table of any color value within the error threshold of the input pixel value;

generating, based on the color table comparison result, encoded data comprising one of a derivative of the input pixel value or an index for the indexed color value;

communicating, to a computer, the encoded data;

updating the color table based on the color table comparison result;

repeating the steps of determining the color table comparison result, generating the encoded data and communicating the encoded data to determine a communication bandwidth of the encoded data; and adjusting the error threshold based on the communication bandwidth.

* * * * *